Nov. 15, 1960    P. U. S. BJORHOLM    2,960,424
CURVED ARMOUR PLATE
Filed Sept. 30, 1955    2 Sheets-Sheet 1

United States Patent Office 2,960,424
Patented Nov. 15, 1960

2,960,424

CURVED ARMOUR PLATE

Poul Ulf Simonsen Bjorholm, Camilla Nielsens Vej 1, Copenhagen F, Denmark

Filed Sept. 30, 1955, Ser. No. 537,844

3 Claims. (Cl. 154—52.5)

This invention relates generally to armor plates and more particularly to a curved armor plate of woven fabric layers of synthetic fibrous material which are bonded under pressure and, for example, heating, by means of a synthetic resin.

Curved armor plates of the aforesaid kind are known, and it has been found that the resistance of such armor plates to the impact of bullets and splinters can be considerably improved by making individual layers or all the layers of the plate of a material having specially oriented fibers. The known armor plates are, however, made of fabric layers woven as a plain weave or a rib weave, which has been found very unsuitable for the manufacture of curved armor plates in practice, since such fabric layers are highly resistant to molding into curved plates because the spun threads can be displaced in relation to each other only to a slight degree and with great difficulty. Furthermore, in a plain weave there are many knotted points per unit area, which is disadvantageous since each such point means a crossing of threads and these are in particular subjected to a breaking stress at the said points particularly when being molded into curved armor.

The aforesaid drawbacks are eliminated or substantially reduced in the curved armor plate according to the invention wherein the woven layers of fabric of fibrous material are constituted of a multi-threaded satin or twill weave. Woven fabric layers of a satin or twill weave can be readily stretched in directions forming an angle of 45 degrees and more with the warp and the weft of the weave and can therefore be readily moulded into any desired curved surface. In addition, such fabric layers have substantially fewer interlacement points per unit of area and the threads are therefore less apt to break, particularly when subjected to compression for the manufacture of the plate which will therefore result in improved strength.

In one embodiment of an armor plate according to the invention the threads of the woven layers consist of non-twisted or slightly twisted threads.

The advantage obtained is that the threads proper have fewer crossings between their fibers. The effect of this is that during the manufacture of the plate when the fibers are compressed, they are not subjected to as many stresses tending to break the individual fibers as in the case of highly twisted threads, and this has also been found to improve the strength of the plate. Furthermore, the slight twisting of the threads means they are exposed to less friction and reduced mechanical stress, while the thread is being spun and during the weaving operation, so that the tensile force necessary for these processes can be considerably reduced. In order to reduce the friction during spinning and weaving, so-called sizing agents are normally used, but these have been found to impair the strength of the fibers, and, in addition, the removal of the sizing agents has a detrimental effect on the strength of the fibers. The removal of the sizing agents is necessary in order that the synthetic resin may effectively bind the fibers and the cloth layers. A further advantage by the use of non-twisted or slightly twisted threads is that the synthetic resin will more readily penetrate between the fibers of the threads, thus ensuring an improved cementing between the fibers, the threads and the synthetic resin.

In a preferred embodiment the fabric layers are arranged in such manner that the direction of the warp in each layer does not coincide with the corresponding direction of the neighboring layers, preferably forming a steep angle with these. As a result, a large number of threads around any point of impact will receive the impact.

In a modified embodiment of the armor plate according to the invention one or more of the fabric layers are mounted on either side of a layer of non-oriented threads or fibers of a cotton-like nature.

As a result, the impact of bullets or splinters striking the outermost layers of the plate will cause these layers to assume a somewhat domed fashion, but if bullets penetrate the outermost layers, the intermediate layer of non-oriented threads will cause the two layers to separate, and bullets will then normally be intercepted by the innermost layers where they will stick with their front surface flattened at the bottom of a depression which constitutes a torn crater.

As material for the threads may be used tough synthetic fibers made in a manner known per se, regardless whether these are of organic origin, in which case polyamides are of special advantage, or of inorganic origin. In the latter case stone or glass threads should be preferred.

In a preferred embodiment of the armor plate the threads consist according to the invention of at least 10 mm. long fibers through the entire length of the weaving thread, whereby the thread will be of a suitable tensile strength.

The invention will now be further described with reference to the drawings, in which Fig. 1 is a perspective view of an embodiment of a part of a curved armor plate according to the invention, viewed in corbic steps section, with a number of fabric layers woven as a biassed twill weave;

Figure 1:
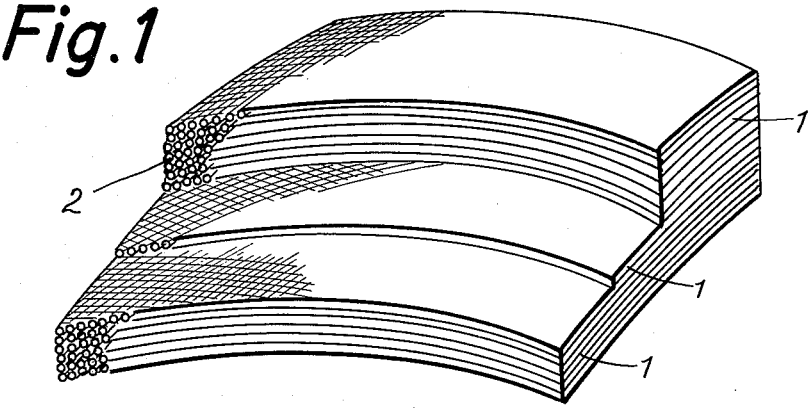

In the drawings a part (Fig. 1) of a curved armor plate is shown as consisting of fourteen fabric layers 1 woven in a biassed twill. Each fabric layer 1 is woven of warp threads 2 and weft threads 3 having interlacement points 4. The threads 2 and 3 are made of tough synthetic fibres in a manner known per se, either of organic or inorganic origin. These fibres are in accordance with the invention non-twisted or slightly twisted.

The woven fabric layers shown in all of the embodiments of the invention have the woof or weft threads 3 carried over individual warp threads 2 forming interlacement points 4. The weft threads after being carried over a warp thread are carried under several warp threads thereby producing the characteristic diagonal ribs or lines running across the texture of the fabric. These diagonal ribs or lines are equally spaced and, of course, are ribbed or ridged because they are formed by the interlacement points 4 at which a weft thread is carried over a warp thread. In the weaves employed according to the invention the weft threads are carried under a relatively large number of warp threads so that the number of interlacings per unit area are much less than the non-interlacing crossings between warp and weft threads. This permits easy displacement of the threads of the fabric relative to each other making it much easier to mold the fabric layers into curved armor and accordingly the threads are not subjected to longitudinal stresses during the molding thereof.

Figure 2:
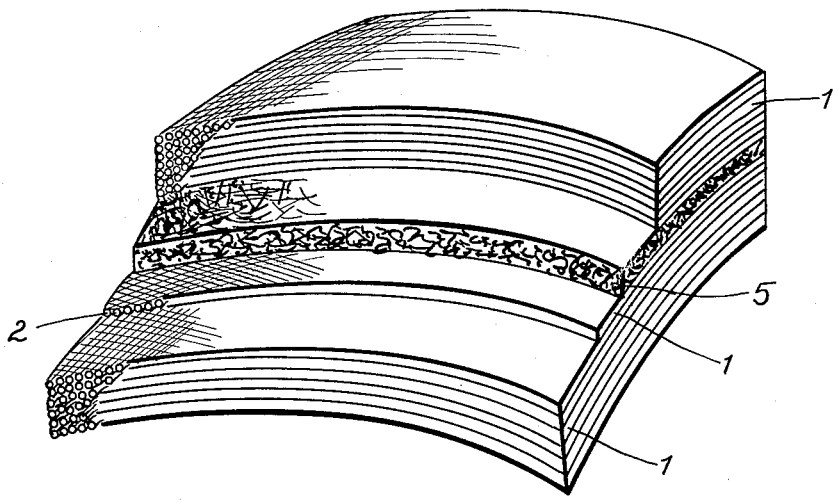
Fig. 2 is a perspective view of another embodiment of the said armor plate, likewise in section, with a number of satin weave fabric layers and an intermediate layer of non-oriented threads.
Figure 3:
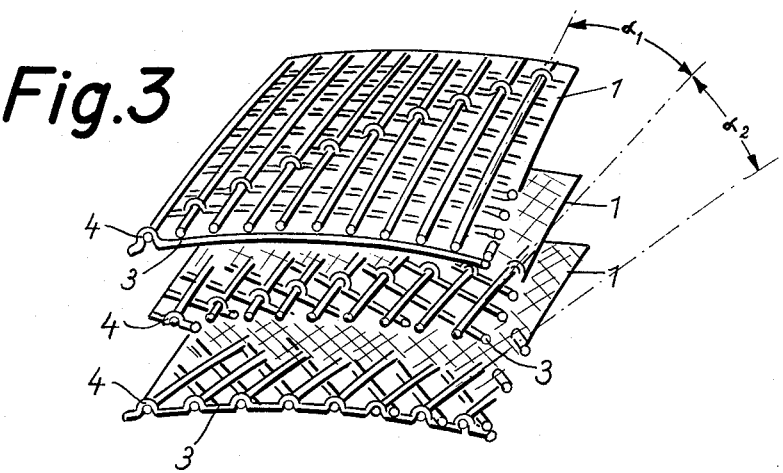
Fig. 3 is a sectional exploded view of a number of superimposed layers of fabric, arranged for assembly to form a curved armor plate in accordance with the invention, the said layers consisting of a woven textile of biassed twill.
Figure 4:
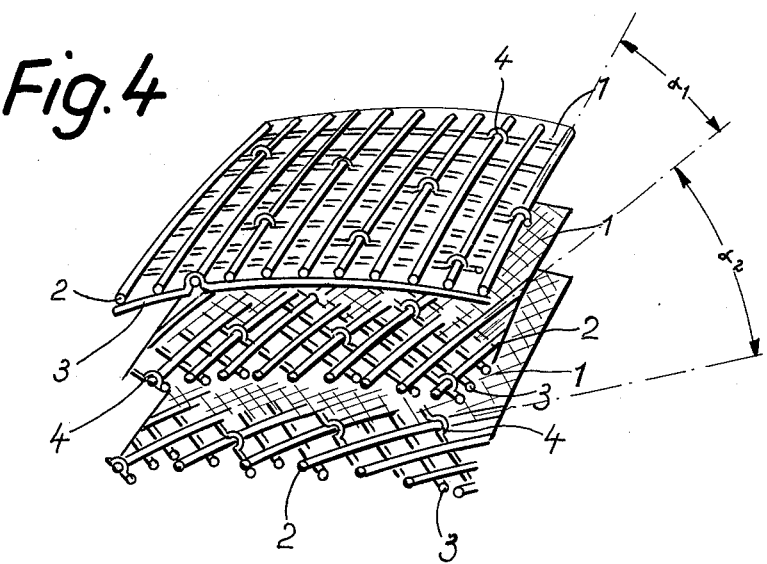
Fig. 4 is a sectional exploded view of a number of fabric layers, arranged for assembly to form a curved armor plate in accordance with the invention, the said layers consisting of a woven fabric of satin twill.

In Figure 2 is shown another embodiment of the curved armor plate according to the invention consisting of fourteen layers 1 of satin twill woven of warp threads 2 and weft threads 3 with interlacement points 4, as shown in Figure 3 and 4. On the top of seven superimposed layers 1 is placed a glass mat about ½ cm. thick and finally another seven woven layers 1 of ten-threaded biassed twill weave or of satin twill weave are placed on the top of said glass mat.

Each consecutive layer 1 is as shown in Figures 3 and 4 and indicated in Figures 1 and 2 according to the invention arranged in such a manner that the direction of the warp in one layer of threads does not coincide with the corresponding direction for the other neighboring layers and preferably forms a steep angle $\alpha_1-\alpha_2$ with the other layers.

For example in an embodiment of the invention a number of cross-threads 2 and 3 may be spun, each thread twisted of about two hundred glass fibers of about 0.007 mm. diameter and of a preferable length according to the invention of at least 10 mm. in a ten threaded biassed twill weave as shown in Figures 1 and 3, or of satin twill weave as shown in Figures 2 and 4. These weaves possess the characteristic of being several times stronger in one direction than in another.

In Figure 1 as well as in Figure 2 the armor plates are shown with the fabric layers thereof in non-compressed and non-soaked conditions, and it will be understood that the woven fabric layers in the final or finished condition of the armor plate will be uniformly bonded to each other throughout the plate. In order to form the armor plates all of the layers are soaked by means of a thermo-setting synthetic resin, for example a polyester, such as one of the commercially obtainable condensation products of phthalic anyhydride and a divalent alcohol with an addition of styrene, after which these layers are subjected to a compression pressure of about 70 kg./sq. cm. at a temperature of about 100 deg. C. for a period of about 15 minutes. The compressed product of uniformly bonded layers will then appear as a hard, greyish-white curved plate which is about 3–5 mm. thick.

Of course, the improvement specifically shown and described by which I obtain the above results, can be changed and modified in various ways without departing from the invention herein disclosed and hereinafter claimed.

I claim as my invention:

1. A curved non-metallic laminated armor plate structure comprising: a plurality of superposed, cross-laid, laminated layers of synthetic fibrous material bonded uniformly throughout the plate by a synthetic resin; each of said layers comprising a fabric of woven synthetic fibrous threads having substantially no twist and in which interlacings between threads form equally spaced diagonal lines across each of the layers in such a way that the number of interlacings between warp threads and weft threads per unit area are less than the non-interlacing crossings between said warp and weft threads; one of said layers being disposed as a reference layer and the other layers each having their warp individually disposed at predetermined different angles other than 90° relative to the warp of the reference layer; and said other layers being disposed on opposite sides of said reference layer.

2. A curved non-metallic laminated armor plate structure comprising; a plurality of superposed, cross-laid, laminated layers of synthetic fibrous material bonded uniformly throughout the plate by a synthetic resin; each of said layers comprising a fabric of woven synthetic fibrous threads having substantially no twist and in which interlacings between threads form equally spaced diagonal lines across each of the layers in such a way that the number of interlacings between warp threads and weft threads per unit area are less than the non-interlacing crossings between said warp and weft threads; one of said layers being disposed as a reference layer and having its warp and weft threads disposed substantially normal to each other, the other layers each having their warp individually disposed at predetermined different angles other than 90° relative to the warp of the reference layer; and said other layers being disposed on opposite sides of said reference layer.

3. A curved non-metallic laminated armor plate structure comprising; a plurality of superposed, cross-laid, laminated layers of synthetic fibrous material bonded uniformly throughout the plate by a synthetic resin; each of said layers comprising a fabric of woven synthetic fibrous threads having substantially no twist and in which interlacings between threads form equally spaced diagonal lines across each of the layers in such a way that the number of interlacings between warp threads and weft threads per unit area are less than the non-interlacing crossings between said warp and weft threads; one of said layers being disposed as a reference layer and the other layers each having their warp individually disposed at predetermined different angles other than 90° relative to the warp of the reference layer; said other layers being disposed on opposite sides of said reference layer, and each individual fibrous thread comprising throughout its length fibers having a length of at least ten millimeters.

References Cited in the file of this patent

UNITED STATES PATENTS

| | | |
|---|---|---|
| 2,399,184 | Heckert | Apr. 30, 1946 |
| 2,466,597 | Kropscott et al. | Apr. 5, 1949 |
| 2,562,951 | Rose et al. | Aug. 7, 1951 |
| 2,570,576 | Lord | Oct. 9, 1951 |
| 2,577,205 | Meyer et al. | Dec. 4, 1951 |
| 2,697,054 | Dietz et al. | Dec. 14, 1954 |